June 4, 1946.  B. E. LUBOSHEZ  2,401,690
BINOCULAR RANGE FINDER
Filed July 18, 1941  2 Sheets-Sheet 2

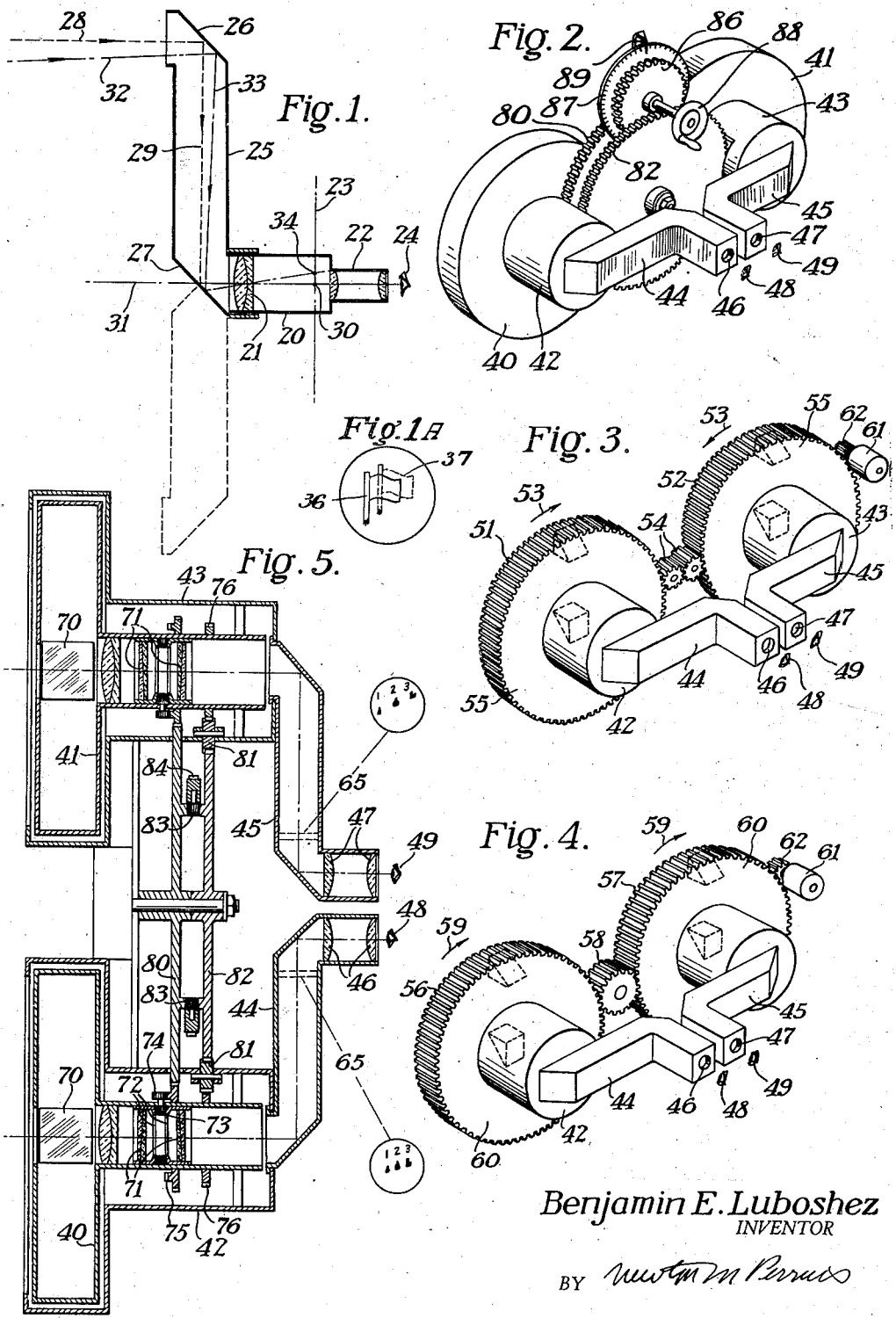

Transparent wheel

Benjamin E. Luboshez
INVENTOR

BY *Newton M. Perrins*

ATTORNEY

Patented June 4, 1946

2,401,690

UNITED STATES PATENT OFFICE 2,401,690

BINOCULAR RANGE FINDER

Benjamin E. Luboshez, Rochester, N. Y., assignor to Eastman Kodak Company, Rochester, N. Y., a corporation of New Jersey Application July 18, 1941, Serial No. 402,984

17 Claims. (Cl. 88—2.7)

This invention relates to range finders and particularly to binocular range finders. It relates specifically to a modification of the moving viewpoint range finder described in my co-pending application, Serial No. 402,982 filed concurrently herewith. Reference is also made to my other applications filed concurrently herewith serial numbers, 402,983; 402,985; 402,986 and 402,987.

It is an object of the invention to provide a moving viewpoint range finder with the advantages of binocular vision.

There are three embodiments of the present invention. In one of these, only one of the eyes is provided with a moving viewpoint range finder, whereas the other eye receives a direct stationary view of the object whose range is to be found. In a second embodiment both eyes are provided with moving viewpoints and the viewpoints move identically and synchronously. The third embodiment has both viewpoints move but they move in the opposite directions.

It is an object of each of the embodiments to provide increased sensitivity. With the second species or with either the first and third species when the viewpoints are held stationary, the invention may be used as a stereo range finder and, hence, has as its object the combination of stereo range finding and moving viewpoint range finding. In general, it is preferable to make preliminary adjustments using the stereo feature of the invention and to use the moving viewpoint feature for the final critical adjustment.

One peculiar feature of the third embodiment is that it gives an apparent motion in depth, to which the eye is extremely sensitive and the elimination of this motion provides an accurate method of range finding.

To provide direct stereo range finding, the usual stereo graticules are positioned in the focus plane of the eyepieces. In the embodiment of the invention wherein both viewpoints move but remain at constant separation, these graticules may be fixed, but in the other embodiments the graticules either have to be adjustable or are useful only when the viewpoints are stopped at a predetermined separation.

Thus according to the invention, a binocular range finder is provided with two eyepieces at interocular separation and two objectives producing in the focus plane of each eyepiece an image of the object whose range is to be found. Some suitable means such as two reflectors rotating in front of one or both of the objectives is provided for shifting the effective viewpoint of at least one of the objectives relative to the optic axis of the corresponding eyepiece. As fully described in the above-mentioned application filed concurrently herewith, the shift of the image in the focus plane as the viewpoint is shifted, is controlled by a suitable wedge or tilting mirror and the adjustment of this control means is a measure of the object range. In the embodiment of the invention wherein the viewpoints of both objectives are moved in circular paths, the viewpoints may be held at constant separation and shift synchronously in the same direction. In this case both eyes receive similar views moving identically in the focus planes and may at any time operate in taking an ordinary stereo reading of the object range. The stereo reading may be taken first and the rotors carrying the viewpoint started for final critical adjustment. On the other hand, if the two rotors are rotated in opposite directions, the object being ranged upon appears to move up and down, toward and away from the observer giving a circular movement in depth.

In the embodiment wherein one viewpoint is held stationary and the other rotated, the two eyes cannot fuse stereoscopically except at the two horizontal positions of the rotating arm or rotor. At all other positions the image reaching one eye is above or below the other. At the two horizontal extreme positions the eyes attempt to fuse the images stereoscopically but at other positions merely see the image of one eye rotating about the other image. Obviously, the eye is extremely critical to the stopping of such a complicated apparent motion of the images.

Other objects and advantages of the invention will be apparent from the following description when read in connection with the accompanying drawings, in which:

Fig. 1 illustrates the principle of moving viewpoint range finders.

Fig. 1A shows the field of view as seen through the instrument.

Fig. 2 is a perspective view of one embodiment of the invention.

Figs. 3 and 4 show alternative forms of the rotor mountings used in Fig. 2.

Fig. 5 is a horizontal cross section of the arrangement shown in Fig. 2.

Figure 6:
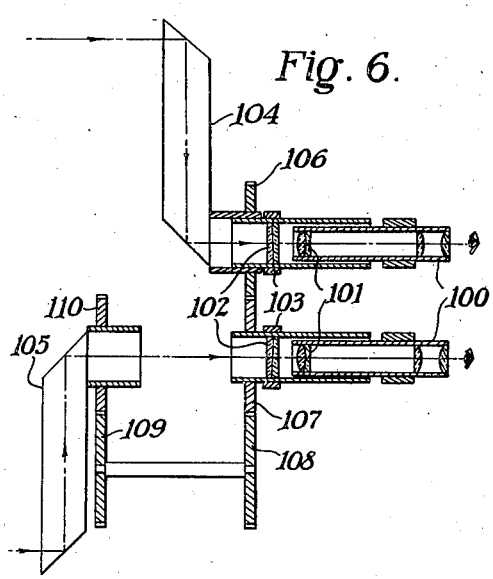

Figs. 6, 7, 8, and 9 schematically show various other embodiments of the invention.

In Fig. 1 a range finder housing 20 carries an objective 21 for forming in its focus plane 23 an image of the object whose range is to be found. This focus plane may be viewed through an eyepiece 22 by the eye 24 of an observer. On the front of the housing 20 a rotating arm 25 is supported with reflecting surfaces 26 and 27 for reflecting light from the object to the objective 21. Objects on the optic axis 31 at infinity submit light as indicated by rays 28 and 29 to form an image 30 in the focal plane 23. Similarly objects at other distances submit rays 32 and 33 to form an image 34 which is to one side of the optic axis. As the rotating arm 25 is rotated about the housing 20, this point 34 and all other parts of the image at that patricular distance move with a circular motion, the point 34 rotating about the optic axis and the image remaining inverted. By suitable adjustment of the reflector 27 or by a suitable wedge means, the point 34 may be brought down to the optic axis, at which time rotation of the rotating arm 25 causes no rotation of the image. The adjustment of the light deviating means is a measure of the range of the object submitting the ray 32.

In Fig. 1A is shown the field of view when ranging on a flag, for example. While the instrument is being operated the image 36 rotates without changing its orientation until the instrument is adjusted to eliminate this motion. If a fixed image such as shown by broken lines 37 is superpositioned on the field as described in the parent application, mentioned above, or if a fixed image is seen with the other eye as in Fig. 7 described below, the image 36 appears to rotate about this fixed image 37.

In Fig. 2, two such rotating viewpoint range finders are provided in which the rotors 40 and 41 rotate in housings 42 and 43 and the image planes are viewed through periscopes 44 and 45 and eyepieces 46 and 47 transmitting light to the eyes 48 and 49 of the observer. The periscopes 44 and 45 are mounted rotatable about the optic axis of each of the systems so that the separation of the eyepieces 46 and 47 may be adjusted to correspond to the interocular separation of different observers. Obviously, the adjustment is quite a simple one and the images remain inverted and are not tilted at any angle by this rotation of the periscopes. In practice, terrestrial eyepieces or erecting prisms are arranged in the periscopes 44, 45 in order to give exact images. As best seen in Fig. 5, the rotors 40 and 41 carrying inner reflectors 70 are rotated by gears 76 engaging idler gears 81 and a driving gear 82. In each system the light deviating means consists of two achromatic wedges 71 which are mounted to rotate in opposite directions on ring gears 72 driven by a pinion 73. The details of such an arrangement are given in my copending application referred to above. The pinion 73 is carried by a pivot extending through the rotating tube and rotated by a pinion 74 engaging a crown gear 75 which is free to rotate on the tube. This crown gear 75 has a spur gear attached thereto driven by a large spur gear 80 which through pinions 83 forms a differential gear with the spur gear 82 so that these gears rotate in opposite directions. As long as the pinions 83 are held in one position in a ring 84, the gears 80 and 82 rotate in opposite directions with the same speed causing the gears 75 and 76 to rotate in the same direction with the same speed, whereby there is no relative rotation of the wedges 71. Referring back to Fig. 2, rotation of a gear 86 engaging the ring gear 84 causes a differential movement between the gears 80 and 82, causing the gear 75 to rotate with respect to the gear 76 which in turn provides the required adjustment of the light deflecting wedges 71. Spur gear 86 is driven by a crank wheel 88 and carries a scale 87 which may be read against an index 89.

Both systems, the right-eye and the left-eye system, are similarly and simultaneously adjusted by this differential gear system. Furthermore the viewpoints rotate in the same direction and rotate synchronously. If the rotors are geared directly together or through an even number of spur gears, they will rotate in opposite directions.

In the arrangements shown in Figs. 3 and 4 the rotors may alternatively be run in the same direction or in opposite directions. In Fig. 3, by means of gears 51 and 52 and coupling gears 54, the rotors 55 are rotated in opposite directions as indicated by arrows 53. The rotor 55 is driven by a motor 61 through a pinion drive 62. In Fig. 4, only a single gear 58 is used between the rotors 60 which are carried by gears 56 and 57. Thus the rotors 60 rotate in the same direction as indicated by arrows 59.

When the instrument is used for stereoscopic range finding, the viewpoints should be at a predetermined separation. Stereoscopic graticules shown in Fig. 5 by broken lines 65 and 66 are stereoscopically positioned in the focus plane of the eyepieces with their optical separations adjusted to correspond to the separation of the viewpoints. The arrangement shown in Fig. 3 gives a variable separation of the viewpoints and this would require the graticules to be coupled to the rotors if the graticules are to be used for stereo range finding at all positions of the rotors. However, I prefer to have the rotors stop in some predetermined position with predetermined separation of the viewpoints before range is taken in the same way as with ordinary stereo range finders. On the other hand, the arrangement shown in Fig. 4 always has constant separation of the viewpoints in the two systems and, therefore, the instrument may be used for stereo range finding at all positions and even when the rotors are rotating. This system has a peculiar advantage not present in ordinary stereo range finders. The object appears to move relative to the graticules and hence the depth alignment is made easier (for some observers) in the same way as it is easier to take a stereo reading on a moving or swaying object. I have filed concurrently herewith an application on a stereo range finder of the present or of the ordinary type in which the graticules are moved back and forth so as to have the desired transverse movement relative to the object being ranged.

Thus the arrangement shown in Fig. 3 has the advantage of utilizing the sensitivity of the eye to motion in depth (as well as up and down motion) whereas the arrangement shown in Fig. 4 has the advantage of being useful at all times as a stereo range finder of enhanced sensitivity.

Figure 8:
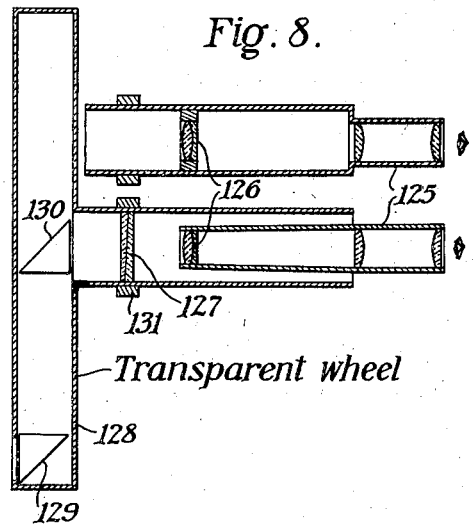
Figure 7:
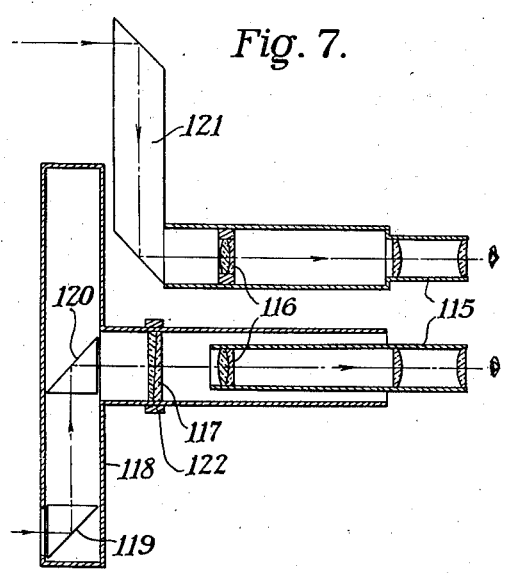

In Fig. 6 is shown a convenient arrangement eliminating the periscopes which are used in Figs. 2 to 5 to bring the light to the eyepieces at interocular separations. In this Fig. 6 the eyepieces 100 are mounted behind rigidly supported objectives 101. Two rotating systems in which are located adjustable light deviating wedges 102 with suitable adjusting means indicated schematically by rings 103 are geared together through gears 106 and 107 to rotate in opposite directions, the gear 106 carrying a rotating arm 104 with it. Similarly gears 108, 109, and 110, rotate an arm 105 in front of the rotating arm 104. As the arms are rotated, the viewpoint of the rotating arm 104 is cut off temporarily as it passes behind the gear 109, but this does not interfere seriously with the operation of the instrument. Details of the adjusting means for the wedges are not shown in Figs. 6 to 9 but may be of any of the forms described in my copending applications. In Fig. 7 the telescopes consist of eyepieces 115 with rigidly supported objectives 116. Only one of the objectives has a rotating viewpoint which is provided by a rotor 118 carrying reflectors 119 and 129 and a variable light deviating wedge 117 adjustable by a suitable ring 122. The other objective has a constant viewpoint provided by a periscope 121 which is held rigidly. And similarly Fig. 8 provides a rotating viewpoint for only one of the objectives, the eyepieces being 125, the objectives rigidly supported being 126, the rotor being 128, carrying reflectors 129 and 130, and adjustable light deviating means 127 with it. Control means indicated by the ring 131 are provided for the light deviating means 127. In this Fig. 8, the rotor 128 is made of transparent material or in the form of a wheel with narrow spokes so as not to interfere with the view of the right-eye objective.

Thus in both Figs. 7 and 8 the right eye receives a direct fixed view of the object whereas the left eye receives a view which moves with a circular motion except when this motion is eliminated by proper adjustment of the control means. For each of the two horizontal positions of the reflectors 119 and 129, the eyes attempt to fuse the images stereoscopically and in one of these positions in the case of Figs. 6 and 8 there is pseudo stereoscopic relief, but for all other positions one image is above the other and there is no stereoscopic fusion. Thus the apparent motion of the images consists of stereo fusion at two different distances combined with a circular movement of one of the images.

The eye is quite critical to the elimination of such complicated movements which thus provide considerable accuracy for range finding.

Figure 9:
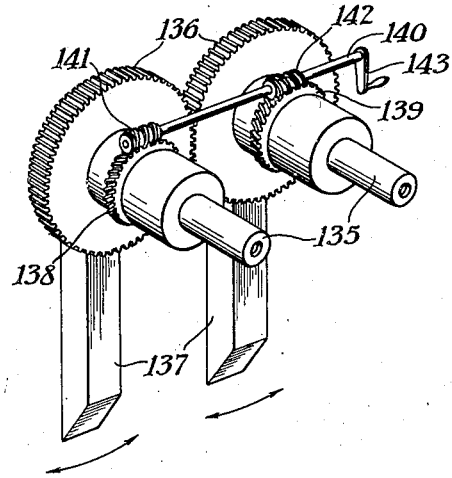

A less preferable embodiment of the invention is shown in Fig. 9 wherein eyepieces 135 view images formed by objectives whose viewpoints are carried in the lower ends of pendulums 137 whose outer gears 136 mesh to give equal and opposite rotation as the pendulums 137 suspended therefrom move back and forth. With this arrangement, the eyes see a back-and-forth motion in depth which may be eliminated by adjusting suitable adjusting means 138 and 139 simultaneously by shaft 140 carrying worms 141 and 142 turned by a crank 143. The worm gears on the adjusting means 138 and 139 do not rotate with the pendulums.

This pendulum embodiment has the advantages of simplicity and compactness. With suitable graticules in the eyepieces, as shown in Fig. 5, the instrument may be used as an ordinary range finder with the pedulums stationary at maximum separation, greater sensitivity being obtained by moving the view points in the final adjustment.

In connection with the embodiments of the invention wherein the viewpoints are rotated synchronously so as to maintain constant separations, it is pointed out that readings can be taken in three dependent ways. Since similar images are presented to each eye, and the base length is fixed, an ordinary stereo reading can be taken at any time. It has been found that for many people, stereo readings are easier to make and more accurate when an object is moving. This same phenomenon occurs when the object is fixed but its image is shifted by the present mechanism. Hence, a second type of stereo reading can be taken while the rotors are rotating to give transverse movement of the image relative to the graticules. An arrangement for giving transverse movement to the graticules is described in my copending application Serial No. 402,987 filed concurrently herewith and may be combined with the present stereo systems. The third type of reading is the adjustment to eliminate all motion.

Another interesting feature comes up in connection with the graticules which remain fixed while the images have an apparent motion in depth, as occurs in the embodiment wherein the viewpoints are moved oppositely. In this embodiment, the graticules serve as reference points thus increasing the accuracy with which movement in depth may be noted. When this apparent motion has been stopped, the effective separation of the viewpoints is a separation of the axes of rotation and if the stereo graticules are in position to correspond to this separation, the stereo range may be read off directly, without reference to the control scale. Thus various embodiments of the invention have various peculiar advantages. An important advantage possessed by all these binocular embodiments of my invention, is that the movement observed and the accuracy of their annulment are not affected by translational or rotational movements of the instrument and this makes them especially valuable where rigid mounting is impossible as on ships at sea. While specific structures have been described, it is pointed out that the invention is not limited to the structures, but is of the scope of the appended claims.

What I claim and desire to secure by Letters Patent of the United States is:

1. A binocular range finder comprising two eyepieces at interocular separation, objectives for forming in the focus plane of each eyepiece an image of the object whose range is to be found, means for shifting cyclically and continuously for a period of time the effective viewpoint of at least one of the objectives, adjustable means coupled to said shifting means for controlling the movement of the corresponding image of the focus plane and means operated by the controlling means for indicating the range of the object when said controlling means is adjusted to the point at which said movement is zero.

2. A range finder according to claim 1 in which the shifting means is a pendulum shifting the viewpoint in an arcuate path.

3. A range finder according to claim 1 in which the shifting means is a rotor shifting the viewpoint in a circular path.

4. A range finder according to claim 1 in which the viewpoint of the other objective is fixed.

5. A range finder according to claim 1 having stereoscopic graticules mounted in the focus planes in stereoscopic relation.

6. A range finder according to claim 1 in which the interocular separation of the eyepieces is adjustable.

7. A binocular range finder comprising two eyepieces at interocular separation, two objectives respectively for forming in the focus planes of each eyepiece an image of the object whose range is to be found, means for synchronously moving the respective viewpoints of the objective, through similar repetitive paths, adjustable means coupled to the moving means for simultaneously controlling the amounts of the movement of the images in the focus planes and scale means for indicating the adjustment of the control means when the image movements during the movement of the objective viewpoints are reduced to zero.

8. A range finder according to claim 7 in which the moving means is geared to move the viewpoints in opposite directions along the repetitive paths.

9. A range finder according to claim 7 in which the moving means is geared to move the viewpoints in the same direction along the repetitive paths and to keep the separation of the viewpoints constant.

10. A binocular range finder comprising a housing, two eyepieces carried by the housing at interocular separation, two objectives respectively for forming in the focus planes of the eyepieces images of the object whose range is to be found, two sets of two reflectors each respectively positioned to receive light from the objects on the outer reflector of each set, to reflect the light to the inner reflector of each set and thence to the focus planes, means on the housing for carrying each set of reflectors rotatable respectively about the optic axes of the objectives at the focus planes, means for cyclically moving the two carrying means synchronously and continuously for a period of time whereby the effective viewpoints of the objectives are moved, adjustable control means operating in synchronism with the moving means for controlling the amount of the movement of the image in each focus plane and scale means for indicating the adjustment of said control means when the image movement during movement of the reflectors is reduced to zero.

11. A range finder according to claim 10 in which the carrying means consists of two rotors respectively for carrying the outer reflectors along circular paths, said rotors being geared to move synchronously.

12. A range finder according to claim 10 in which the moving means moves the two carrying means in opposite directions.

13. A range finder according to claim 10 in which the moving means moves the two carrying means in the same direction to keep the separation between the outer reflectors constant.

14. A range finder according to claim 10 in which the carrying means are rotors geared to move synchronously and two periscopes are respectively positioned to direct the light between the inner reflectors and the eyepieces which are carried by the periscopes.

15. A range finder according to claim 10 in which the carrying means are rotors geared to move synchronously and two periscopes are respectively positioned to direct light between the inner reflectors and the eyepieces which are carried by and constitute the exit windows of the periscopes, the periscopes being rotatable about their entrance windows to change the separation of the eyepieces.

16. A range finder according to claim 10 having stereoscopic graticules stereoscopically positioned in the focus planes of the eyepieces.

17. A range finder according to claim 10 in which the moving means moves the two carrying means in the same direction to keep the separation between the outer reflectors constant and stereoscopic graticules corresponding to this constant separation of the viewpoints are stereoscopically positioned in the focus planes of the eyepieces.

BENJAMIN E. LUBOSHEZ.